(12) United States Patent
Bonnefoi et al.

(10) Patent No.: US 10,794,390 B2
(45) Date of Patent: Oct. 6, 2020

(54) MODULAR TURBO COMPRESSOR SHAFT

(71) Applicant: Danfoss Silicon Power GmbH, Flensburg (DE)

(72) Inventors: Patrice Bonnefoi, Nordborg (DK); Arnaud Daussin, Nordborg (DK); Yves Rosson, Nordborg (DK)

(73) Assignee: Danfoss Silicon Power GmbH, Flensburg (DE)

( * ) Notice: Subject to any disclaimer, the term of this patent is extended or adjusted under 35 U.S.C. 154(b) by 85 days.

(21) Appl. No.: 16/329,332

(22) PCT Filed: Aug. 31, 2017

(86) PCT No.: PCT/EP2017/071849
§ 371 (c)(1),
(2) Date: Feb. 28, 2019

(87) PCT Pub. No.: WO2018/041938
PCT Pub. Date: Mar. 8, 2018

(65) Prior Publication Data
US 2019/0249682 A1   Aug. 15, 2019

(30) Foreign Application Priority Data

Sep. 2, 2016   (FR) ..................... 16 58169

(51) Int. Cl.
*F04D 29/044*   (2006.01)
*F04D 29/054*   (2006.01)
(Continued)

(52) U.S. Cl.
CPC ............ *F04D 29/054* (2013.01); *F02C 7/275* (2013.01); *F02C 7/36* (2013.01); *F04D 25/06* (2013.01);
(Continued)

(58) Field of Classification Search
CPC ...... F04D 25/02; F04D 25/06; F04D 25/0606; F04D 29/051; F04D 29/054; F04D 29/266; F05D 2240/61; F05D 2260/37
See application file for complete search history.

(56) References Cited

U.S. PATENT DOCUMENTS

| 4,063,850 A | 12/1977 | Hueber et al. |
| 6,866,478 B2 | 3/2005 | Fabian et al. |

(Continued)

FOREIGN PATENT DOCUMENTS

| CN | 1249862 A | 4/2000 |
| CN | 102322448 A | 1/2012 |

(Continued)

OTHER PUBLICATIONS

International Search Report For Serial No. PCT/EP2017/071849 dated Nov. 23, 2017.

*Primary Examiner* — Ninh H. Nguyen
(74) *Attorney, Agent, or Firm* — McCormick, Paulding & Huber PLLC

(57) ABSTRACT

The Modular turbo compressor shaft (4) comprise a tubular bearing portion (5) having a first axial end portion and a second axial end portion; an impeller portion (6) arranged at the first axial end portion of the tubular bearing portion (5); and a driving portion (7) arranged at the second axial end portion of the tubular bearing portion (5). The tubular bearing portion (5) is made of a hard material, and the impeller portion (6) and/or the driving portion (7) are made of relatively soft material compared to the hard material of the tubular bearing portion (5). The impeller portion (6) and/or the driving portion (7) are at least partially extending into the tubular bearing portion (5) and are firmly connected to the tubular bearing portion (5). The tubular bearing portion (5), the impeller portion (6) and the driving portion (7) are configured such that radial deformations, occurring (Continued)

during assembly of the impeller portion (6) and/or the driving portion (7) to the tubular bearing portion (5), are substantially limited to the driving portion (7) and/or the impeller portion (6).

20 Claims, 1 Drawing Sheet

(51) Int. Cl.
- *F04D 25/06* (2006.01)
- *F04D 29/051* (2006.01)
- *F04D 29/057* (2006.01)
- *F04D 29/28* (2006.01)
- *F04D 29/053* (2006.01)
- *F02C 7/275* (2006.01)
- *F02C 7/36* (2006.01)
- *F16C 3/02* (2006.01)

(52) U.S. Cl.
CPC ......... *F04D 29/053* (2013.01); *F04D 29/057* (2013.01); *F04D 29/0513* (2013.01); *F04D 29/284* (2013.01); *F16C 3/023* (2013.01); *F05D 2250/311* (2013.01); *F05D 2250/36* (2013.01); *F05D 2260/37* (2013.01); *F05D 2300/506* (2013.01)

(56) References Cited

U.S. PATENT DOCUMENTS

| | | | |
|---|---|---|---|
| 10,578,117 B2* | 3/2020 | Barthes | H02K 1/2706 |
| 2004/0076532 A1* | 4/2004 | Miyazaki | H02K 5/128 |
| | | | 417/357 |
| 2007/0069597 A1 | 3/2007 | Taniguchi et al. | |
| 2011/0243485 A1* | 10/2011 | Kume | F16C 17/024 |
| | | | 384/106 |
| 2013/0101433 A1* | 4/2013 | Colson | F04D 25/06 |
| | | | 416/244 R |

FOREIGN PATENT DOCUMENTS

| | | |
|---|---|---|
| CN | 105889096 A | 8/2016 |
| DE | 102008056061 A1 | 2/2010 |
| WO | 9834324 A1 | 8/1998 |

\* cited by examiner

MODULAR TURBO COMPRESSOR SHAFT

CROSS-REFERENCE TO RELATED APPLICATIONS

This application is a National Stage application of International Patent Application No. PCT/EP2017/071849, filed on Aug. 31, 2017, which claims priority to French Patent Application No. 1658169, filed on Sep. 2, 2016, each of which is hereby incorporated by reference in its entirety.

TECHNICAL FIELD

The present invention relates to a rotor shaft for a turbo compressor, and in particular for a high speed turbo compressor.

BACKGROUND

U.S. Pat. No. 4,063,850 discloses a gas turbine motor with a turbo compressor comprising notably:
a turbo compressor shaft, also named rotor shaft, including:
  a tubular bearing portion having a first axial end portion and a second axial end portion opposite to the first axial end portion,
  an impeller portion arranged at the first axial end portion of the tubular bearing portion, and
  a driving portion arranged at the second axial end portion of the tubular bearing portion,
at least one compression stage configured to compress a refrigerant, the at least one compression stage including at least one impeller connected to the impeller portion of the turbo compressor shaft,
a radial bearing arrangement configured for rotatably supporting the tubular bearing portion, and
an axial bearing arrangement configured to limit an axial movement of the turbo compressor shaft during operation.

According to U.S. Pat. No. 4,063,850, the tubular bearing portion and the driving portion are formed as an integral part, and are connected to the impeller portion by an annular fusing joint.

Despite such a turbo compressor shaft is less costly to manufacture compared to monolithic turbo compressor shafts, the manufacturing of such a turbo compressor shaft is still expensive and time consuming due to the hard material used to make the driving portion. Indeed, such a hard material is difficult to machine, due to its high surface hardness.

Further, the disclosed fusing joint configuration of the connection between the tubular bearing portion and the impeller portion may lead to a breaking of said connection, and thus may harm the reliability of such a turbo compressor shaft, particularly when the turbo compressor shaft is driven at very high speeds. Such fused joints may also be expensive to make, due to addition of special materials and necessary precise control of the temperature profiles during joining process.

SUMMARY

It is an object of the present invention to provide an improved turbo compressor shaft which can overcome the drawbacks encountered in conventional turbo compressor shafts.

Another object of the present invention is to provide a modular turbo compressor shaft which is reliable, and easier and less costly to manufacture.

According to the invention such a modular turbo compressor shaft comprises:
  a tubular bearing portion having a first axial end portion and a second axial end portion opposite to the first axial end portion,
  an impeller portion arranged at the first axial end portion of the tubular bearing portion, and
  a driving portion arranged at the second axial end portion of the tubular bearing portion,
  wherein the tubular bearing portion is made of a hard material, and the impeller portion and/or the driving portion are made of relatively soft material compared to the hard material of the tubular bearing portion,
  wherein the impeller portion and/or the driving portion is at least partially extending into the tubular bearing portion and are firmly connected to the tubular bearing portion, and
  wherein the tubular bearing portion, the impeller portion and the driving portion are configured such that radial deformations, occurring during assembly of the impeller portion and/or the driving portion to the tubular bearing portion, are substantially limited to the driving portion and/or the impeller portion.

Such a configuration of the modular turbo compressor shaft reduces machining costs, as only the tubular bearing portion, which has to fulfil small tolerances and increased wear resistance, is made of hard material. The other shaft portions made of softer (and less stiff) materials are easier to machine, and absorb the major part of radial deformations, which occur during the assembly (e.g. heat shrinking) process of the modular turbo compressor shaft. Thus, tolerances of the outer surfaces of the impeller portion and/or the driving portion can be increased without any risk of over constraint on the tubular bearing portion.

Further the softer shaft portions take up the deformations occurring during compressor operation, caused by different coefficients of thermal expansion of hard and soft materials.

Therefore the deformations of the tubular bearing portion occurring during the assembly of the modular turbo compressor shaft and occurring in operation are limited. This results in an improvement of the reliability of the radial and axial bearings supporting the modular turbo compressor shaft, particularly when gas bearings are used as they require very small clearance to be stable while requiring enough clearance to avoid bearing seizure.

Consequently, the modular turbo compressor shaft according to the present invention is more reliable, lighter, and easier and less costly to manufacture than conventional turbo compressor shafts.

The turbo compressor shaft may also include one or more of the following features, taken alone or in combination.

According to an embodiment of the invention, the impeller portion and the driving portion are at least partially extending into the tubular bearing portion and are firmly connected to the tubular bearing portion, the tubular bearing portion, the impeller portion and the driving portion being configured such that radial deformations, occurring during assembly of the impeller portion and the driving portion to the tubular bearing portion, are substantially limited to the driving portion and the impeller portion.

According to an embodiment of the invention, the impeller portion and/or the driving portion are connected to the tubular bearing portion by press-fit or shrink-fit, the tubular bearing portion, the impeller portion and the driving portion being configured such that radial deformations, occurring during shrink-fit or press-fit assembly of the impeller portion and/or the driving portion to the tubular bearing portion, are substantially limited to the driving portion and/or the impeller portion.

According to an embodiment of the invention, the impeller portion and/or the driving portion are connected to the tubular bearing portion by heat shrink-fit.

According to an embodiment of the invention, the impeller portion and/or the driving portion are radially deformable during assembly of the impeller portion and/or the driving portion to the tubular bearing portion.

According to an embodiment of the invention, the ratio between the Vickers hardness of the hard material of the tubular bearing portion and the Vickers hardness of the relatively soft material of the impeller portion is higher than 3.

According to an embodiment of the invention, the ratio between the Vickers hardness of the hard material of the tubular bearing portion and the Vickers hardness of the relatively soft material of the driving portion is higher than 3.

According to an embodiment of the invention, the tubular bearing portion includes:
 a tubular cylindrical part having an outer surface configured to cooperate with a radial bearing arrangement of a turbo compressor, and
 a flat disc shaped part having an outer diameter larger than the outer diameter of the tubular cylindrical part, the flat disc shaped part having a first axial end face and a second axial end face opposite to the first axial end face, the first and second axial end faces being configured to cooperate with an axial bearing arrangement.

According to an embodiment of the invention, the driving portion is firmly connected to the tubular cylindrical part.

According to an embodiment of the invention, the impeller portion is firmly connected to the tubular cylindrical part and to the flat disc shaped part.

According to an embodiment of the invention, the flat disc shaped part includes a central opening having a diameter substantially corresponding to the inner diameter of the tubular cylindrical part.

According to an embodiment of the invention, the tubular cylindrical part and the flat disc shaped part are formed as an integral part or as two separate parts.

According to an embodiment of the invention, the tubular bearing portion is made of a high strength material having a high surface hardness.

According to an embodiment of the invention, the tubular bearing portion is made of tungsten carbide or ceramic materials.

According to an embodiment of the invention, the hard material of the tubular bearing portion has a Vickers hardness of more than 1500 HV.

According to an embodiment of the invention, the relatively soft material of the impeller portion has a Vickers hardness of less than 500 HV.

According to an embodiment of the invention, the impeller portion is made of titanium alloys or aluminum alloys.

According to an embodiment of the invention, the driving portion comprises:
 a mounting part arranged inside the tubular bearing portion, and
 a rotor attachment part for the attachment of a rotor of the turbo compressor.

According to an embodiment of the invention, the mounting part of the driving portion is arranged inside the tubular cylindrical part.

According to an embodiment of the invention, the mounting part of the driving portion is arranged inside the tubular bearing portion by shrink-fit or press-fit.

According to an embodiment of the invention, the mounting part of the driving portion includes a cylindrical outer surface.

According to an embodiment of the invention, the rotor attachment part includes an axial bore extending along at least a portion of the length of the rotor attachment part, the axial bore being configured to receive the rotor.

According to an embodiment of the invention, the rotor may comprise permanent magnets and may be firmly fitted, for example press fitted or shrink fitted, within the axial bore of the rotor attachment part.

According to an embodiment of the invention, the rotor attachment part is tubular.

According to an embodiment of the invention, the mounting part of the driving portion includes an axial hole extending along at least a portion of the length of the mounting part of the driving portion. Such a configuration of the driving portion reduces the weight of the latter, and thus of the turbo compressor shaft.

According to an embodiment of the invention, the axial hole provided on the driving portion extends at least partially into the tubular bearing portion. Such a configuration of the driving portion increases the flexibility of the mounting part of the driving portion, and thus allows to further limit radial deformations of the tubular bearing portion occurring during the assembly of the turbo compressor shaft.

According to an embodiment of the invention, the driving portion is made of a titanium alloy or other non-magnetic material.

According to an embodiment of the invention, the relatively soft material of the driving portion has a Vickers hardness of less than 500 HV.

According to an embodiment of the invention, the impeller portion comprises:
 a mounting part at least partially arranged inside the tubular bearing portion, and
 an impeller attachment part for the attachment of at least one impeller.

According to an embodiment of the invention, the mounting part of the impeller portion is at least partially arranged inside the tubular cylindrical part.

According to an embodiment of the invention, the mounting part of the impeller portion is connected to the tubular bearing portion by shrink-fit or press-fit.

According to an embodiment of the invention, the mounting part of the impeller portion includes an outer surface substantially cylindrical.

According to an embodiment of the invention, the mounting part of the impeller portion includes an axial hole extending along at least a portion of the length of said mounting part. Such a configuration of the impeller portion reduces the weight of the latter, and thus of the turbo compressor shaft.

According to an embodiment of the invention, the axial hole provided on the impeller portion extends at least partially into the tubular bearing portion. Such a configuration of the impeller portion increases the flexibility of the mounting part of the impeller portion, and thus allows to further limit radial deformations of the tubular bearing portion occurring during the assembly of the turbo compressor shaft.

According to an embodiment of the invention, the flat disc shaped part is connected to the mounting part of the impeller portion, and is arranged around said mounting part.

According to an embodiment of the invention, the flat disc shaped part is adjacent to an axial end of the tubular cylindrical part.

According to an embodiment of the invention, the flat disc shaped part extends radially outwardly with respect to the mounting part of the impeller portion.

According to an embodiment of the invention, the tubular bearing portion, the impeller portion and the driving portion extends along a same longitudinal axis.

According to an embodiment of the invention, the turbo compressor shaft is configured to be axially and radially supported by gas bearing arrangements formed at outer surfaces of the tubular bearing portion.

The present invention also relates to a centrifugal turbo compressor including a modular turbo compressor shaft according to the present invention.

According to an embodiment of the invention, the centrifugal turbo compressor further includes:
- at least one compression stage configured to compress a refrigerant, the at least one compression stage including at least one impeller connected to the impeller portion of the turbo compressor shaft,
- an electric motor configured for driving in rotation the turbo compressor shaft about a rotation axis, the electric motor including a stator and a rotor, the rotor being connected to the driving portion of the turbo compressor shaft.

According to an embodiment of the invention, the centrifugal turbo compressor further includes a radial bearing arrangement configured for rotatably supporting the tubular bearing portion.

According to an embodiment of the invention, the radial bearing arrangement is a gas bearing arrangement.

According to an embodiment of the invention, the radial bearing arrangement is configured to cooperate with an outer surface of the tubular cylindrical part.

According to an embodiment of the invention, the radial bearing arrangement includes a radial bearing extending along at least a part of the length of the tubular cylindrical part.

According to an embodiment of the invention, the centrifugal turbo compressor further includes a thrust bearing arrangement configured to limit an axial movement of the turbo compressor shaft during operation.

According to an embodiment of the invention, the thrust bearing arrangement is located between the electric motor and the first compression stage.

According to an embodiment of the invention, the thrust bearing arrangement is configured to cooperate with the first and second axial end faces of the flat disc shaped part.

According to an embodiment of the invention, the thrust bearing arrangement is a gas bearing arrangement.

According to an embodiment of the invention, the thrust bearing arrangement includes a first annular thrust bearing element having a first thrust bearing surface, and a second annular thrust bearing element having a second thrust bearing surface, the first and second thrust bearing surfaces being configured to respectively cooperate with the first and second axial end faces of the flat disc shaped part.

These and other advantages will become apparent upon reading the following description in view of the drawing attached hereto representing, as a non-limiting example, one embodiment of a turbo compressor shaft according to the invention.

BRIEF DESCRIPTION OF THE DRAWINGS

The following detailed description of one embodiment of the invention is better understood when read in conjunction with the appended drawings being understood, however, that the invention is not limited to the specific embodiment disclosed.

DETAILED DESCRIPTION

Figure 1:
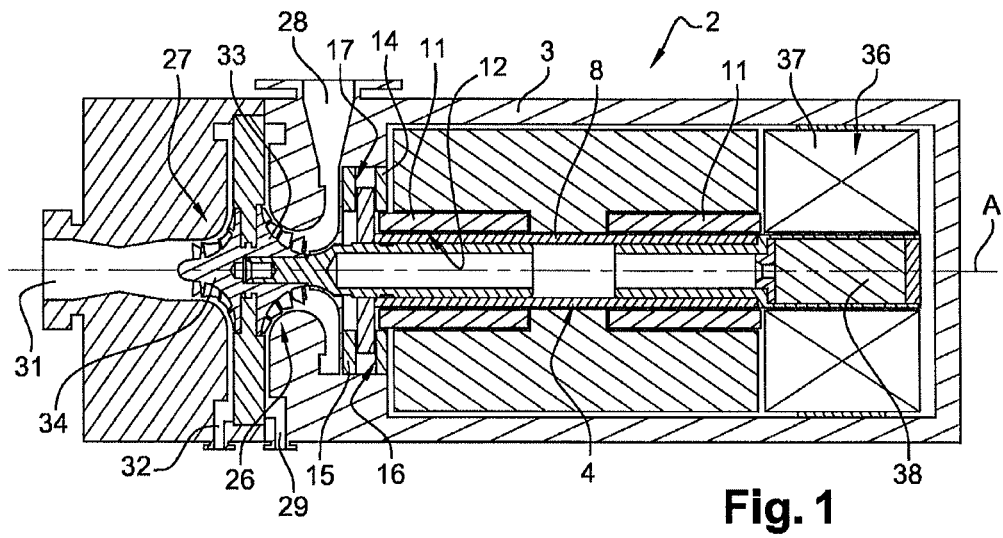
FIG. 1 is a longitudinal section view of a centrifugal turbo compressor including a turbo compressor shaft according to the invention.

FIG. 1 represents a centrifugal turbo compressor 2, and particularly a two-stage centrifugal turbo compressor. The centrifugal turbo compressor 2 includes a hermetic housing 3, and a turbo compressor shaft 4 rotatably arranged within the hermetic housing 3 and extending along a longitudinal axis A.

Figure 2:
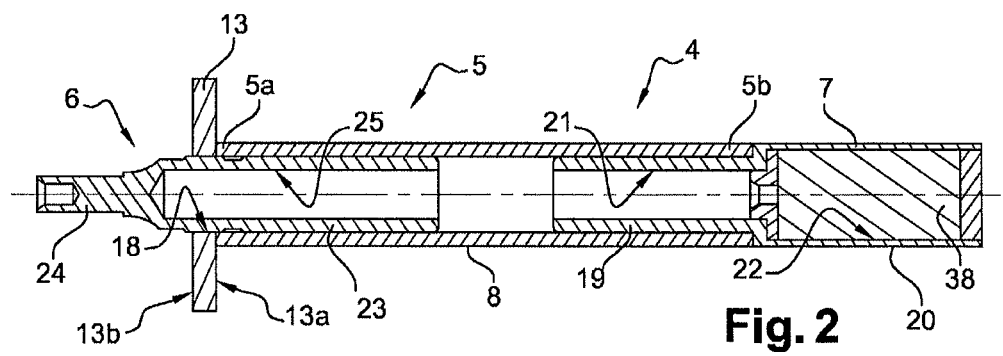
FIG. 2 is a longitudinal section view of the turbo compressor shaft of FIG. 1.
Figure 3:
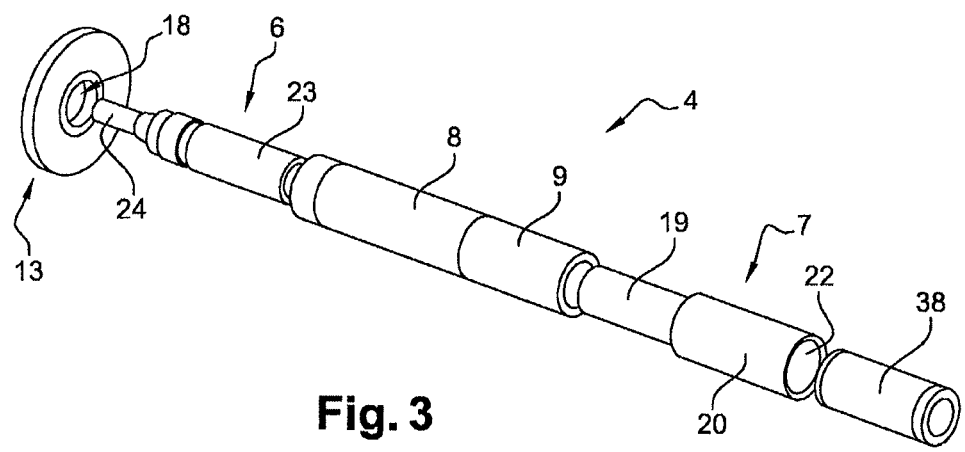
FIG. 3 is an exploded perspective view of the turbo compressor shaft of FIG. 1.

As better shown on FIGS. 2 and 3, the turbo compressor shaft 4 includes a tubular bearing portion 5, an impeller portion 6 arranged at a first axial end portion 5a of the tubular bearing portion 5, and a driving portion 7 arranged at a second axial end portion 5b of the tubular bearing portion 5. The impeller portion 6 and the driving portion 7 are partially extending into the tubular bearing portion 5 and are firmly connected to the tubular bearing portion 5, by press-fit or shrink-fit. Particularly, the tubular bearing portion 5, the impeller portion 6 and the driving portion 7 are defined such that radial deformations, occurring during shrink-fit or press-fit assembly of the impeller portion 6 and the driving portion 7 to the tubular bearing portion 5, are substantially limited to the driving portion 7 and the impeller portion 6.

The tubular bearing portion 5 includes a tubular cylindrical part 8 having an outer surface 9 configured to cooperate with a radial bearing arrangement configured for rotatably and radially supporting the turbo compressor shaft 4.

According to the embodiment shown on the figures, the radial bearing arrangement includes at least one radial bearing 11, such as a radial sleeve bearing, located within the hermetic housing 3 and having an inner surface 12 configured to cooperate with the outer surface 9 of the tubular cylindrical part 8. The or each radial bearing 11 may be a fluid radial bearing, and for example a gas radial bearing. According to the embodiment shown on the figures, the radial bearing arrangement includes a plurality of radial bearings 11, for example two, distributed along the axial length of the tubular cylindrical part 8. However the radial bearing arrangement may include only one radial bearing 11 extending along the tubular cylindrical part 8.

The tubular bearing portion 5 further includes a flat disc shaped part 13 which extends coaxially with the tubular cylindrical part 8. The flat disc shaped part 13 has an outer diameter larger than the outer diameter of the tubular cylindrical part 8, and includes a first axial end face 13a and a second axial end face 13b opposite to the first axial end face 13a. The first and second axial end faces 13a, 13b are configured to cooperate with an axial bearing arrangement, also named thrust bearing arrangement, configured to limit an axial movement of the turbo compressor shaft 4 during operation. According to the embodiment shown on the figures, the axial bearing arrangement includes a first annular thrust bearing element 14 and a second annular thrust bearing element 15 located within the hermetic housing 3. The first annular thrust bearing element 14 has a first thrust bearing surface 16 configured to cooperate with the first axial end face 13a of the flat disc shaped part 13, and the second annular thrust bearing element 15 has a second thrust bearing surface 17 configured to cooperate with the second axial end face 13b of the flat disc shaped part 13.

According to the embodiment shown on the figures, the flat disc shaped part 13 is adjacent to an axial end of the tubular cylindrical part 8 which is opposite to the driving portion 7, and includes a central opening 18 having a diameter substantially corresponding to the inner diameter of the tubular cylindrical part 8. Further, according to the embodiment shown on the figures, the tubular cylindrical part 8 and the flat disc shaped part 13 are formed as two separate parts. However, according to another embodiment of the invention, the tubular cylindrical part 8 and the flat disc shaped part 13 could be formed as an integral part.

Advantageously, the tubular bearing portion 5 (i.e. the tubular cylindrical part 8 and the flat disc shaped part 13) is made of a hard material having a Vickers hardness of more than 1500 HV. According to an embodiment of the invention, the tubular bearing portion 5 is made of a high strength material having a high surface hardness. For example, the tubular bearing portion 5 may be made of tungsten carbide or ceramic materials. Tungsten carbide is especially preferred, due to its relatively low thermal expansion coefficient combined with relatively high thermal conductivity, which is advantageous to control the clearance in the gas bearings and to remove heat during compressor operation. Hereby, the risk of bearing seizures is further reduced.

As better shown on FIG. 2, the driving portion 7 comprises a mounting part 19 and a tubular rotor attachment part 20 each extending along the longitudinal axis A of the turbo compressor shaft 4. The mounting part 19 is arranged inside the tubular cylindrical part 8 of the tubular bearing portion 5, and has a cylindrical outer surface configured to cooperate with the inner surface of the tubular bearing portion 5. Further, the mounting part 19 of the driving portion 7 includes an axial hole 21 extending along at least a portion of the length of the mounting part 19 and emerging in a end face of the mounting part 19 opposite to the rotor attachment part 20. Advantageously, the axial hole 21 extends into the tubular cylindrical part 8.

The tubular rotor attachment part 20 includes an axial bore 22 emerging in an end face of the tubular rotor attachment part 20 opposite to the impeller portion 6. The axial bore 22 may also emerge into the axial hole 21.

According to the embodiment shown on the figures, the driving portion 7 is in one piece. However, according to another embodiment of the invention, the mounting part 19 and the tubular rotor attachment part 20 could be formed as two separate parts connected together.

Advantageously, the driving portion 7 is made of relatively soft material compared to the hard material of the tubular bearing portion 5. According to an embodiment of the invention, the relatively soft material of the driving portion 7 has a Vickers hardness of less than 500 HV. For example, the driving portion 7 is made of a titanium alloy or other non-magnetic material.

The impeller portion 6 comprises a mounting part 23 and an impeller attachment part 24 each extending along the longitudinal axis A of the turbo compressor shaft 4. The mounting part 23 is partially arranged inside the tubular cylindrical part 8, and includes an outer surface substantially cylindrical and configured to cooperate with the inner surface of the tubular cylindrical part 8. Further, the mounting part 23 of the impeller portion 6 includes an axial hole 25 extending along at least a portion of the length of the mounting part 23 and emerging in a end face of the mounting part 23 opposite to the impeller attachment part 24. Advantageously, the axial hole 25 extends partially into the tubular cylindrical part 8.

It should be noted that the flat disc shaped part 13 is firmly connected to the mounting part 23 of the impeller portion 6 by press-fit or shrink-fit, and extends radially outwardly with respect to the mounting part 23 of the impeller portion 6.

According to the embodiment shown on the figures, the impeller portion 6 is in one piece. However, according to another embodiment of the invention, the mounting part 23 and the impeller attachment part 24 could be formed as two separate parts connected together.

Advantageously, the impeller portion 6 is made of relatively soft material compared to the hard material of the tubular bearing portion 5. According to an embodiment of the invention, the relatively soft material of the impeller portion 6 has a Vickers hardness of less than 500 HV. For example, the impeller portion 6 is made of titanium alloys or aluminum alloys.

The centrifugal refrigeration compressor 2 further includes a first compression stage 26 and a second compression stage 27 configured to compress a refrigerant. The first compression stage 26 includes a fluid inlet 28 and a fluid outlet 29, while the second compression stage 27 includes a fluid inlet 31 and a fluid outlet 32, the fluid outlet 29 of the first compression stage 26 being fluidly connected to the fluid inlet 31 of the second compression stage 27.

The hermetic housing 3 includes therefore a low pressure chamber located upstream the first compression stage 26, a high pressure chamber located downstream the second compression stage 27, and an intermediate pressure chamber provided between the fluid outlet 29 of the first compression stage 26 and the fluid inlet 31 of the second compression stage 27.

The first and second compression stages 26, 27 respectively include a first impeller 33 and a second impeller 34. The first and second impellers 33, 34 are connected to the impeller attachment part 24. According to the embodiment shown on the figures, the first and second impellers 33, 34 are provided on an impeller member 35 secured to the impeller attachment part 24, and are arranged in a back-to-back configuration, so that the directions of fluid flow at the fluid inlet 28, 31 of the first and second compression stages 26, 27 are opposite to each other.

Each of the first and second impellers 33, 34 includes a front side equipped with a plurality of blades configured to accelerate, during rotation of the turbo compressor shaft 4, the refrigerant entering the respective one of the first and second compression stages 26, 27, and to deliver the accelerated refrigerant to a diffuser arranged at the radial outside edge of the respective one of the first and second impellers 33, 34.

According to an embodiment of the invention, the centrifugal turbo compressor 2 is configured so that a part of the refrigerant compressed by the first and second compression stages 26, 27 is used as lubricating fluid in the gas radial bearing arrangement and the gas thrust bearing arrangement.

The centrifugal refrigeration compressor 2 further includes an electric motor 36 configured for driving in rotation the turbo compressor shaft 4 about its longitudinal axis A. According to the embodiment shown on the figures, the electric motor 36 is arranged in the low pressure chamber defined by the hermetic housing 3.

The electric motor 36 includes a stator 37 and a rotor 38. Advantageously, the rotor 38 comprises permanent magnets, and is firmly fitted, for example press fitted or shrink fitted, within the axial bore 22 of the rotor attachment part 20. According to the embodiment shown on the figures, the thrust bearing arrangement is located between the electric motor 36 and the first compression stage 26.

The different portions of a rotor shaft according to the invention are optimized in relation to their function, manufacturability and costs:

Bearing portion: Light weight, high strength, small dimensional tolerances and high hardness on outer surface for gas bearings, low thermal expansion coefficient, good thermal conductivity for heat removal, Driving portion: high strength to accommodate a high speed rotor, non-magnetic, good thermal conductivity for heat removal, easy to machine due to larger tolerances, relatively soft to limit stress during connection with rotor and bearing portion, Impeller portion: high strength to accommodate at least one high speed impeller, easy to machine due to larger tolerances, relatively soft to limit stress during connection with impeller and bearing portions.

Of course, the invention is not restricted to the embodiment described above by way of non-limiting example, but on the contrary it encompasses all embodiments thereof.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. Modular turbo compressor shaft comprising:
    a tubular bearing portion having a first axial end portion and a second axial end portion opposite to the first axial end portion,
    an impeller portion arranged at the first axial end portion of the tubular bearing portion, and
    a driving portion arranged at the second axial end portion of the tubular bearing portion,
    wherein the tubular bearing portion is made of a hard material, and the impeller portion and/or the driving portion are made of relatively soft material compared to the hard material of the tubular bearing portion,
    wherein the impeller portion and/or the driving portion are at least partially extending into the tubular bearing portion and are firmly connected to the tubular bearing portion, and in that the tubular bearing portion, the impeller portion and the driving portion are configured such that radial deformations, occurring during assembly of the impeller portion and/or the driving portion to the tubular bearing portion, are substantially limited to the driving portion and/or the impeller portion.

2. The modular turbo compressor shaft according to claim 1, wherein the impeller portion and/or the driving portion are connected to the tubular bearing portion by press-fit or shrink-fit, the tubular bearing portion, the impeller portion and the driving portion being configured such that radial deformations, occurring during shrink-fit or press-fit assembly of the impeller portion and/or the driving portion to the tubular bearing portion, are substantially limited to the driving portion and/or the impeller portion.

3. The modular turbo compressor shaft according to claim 1, wherein:
    the ratio between the Vickers hardness of the hard material of the tubular bearing portion and the Vickers hardness of the relatively soft material of the impeller portion is higher than 3, and/or
    the ratio between the Vickers hardness of the hard material of the tubular bearing portion and the Vickers hardness of the relatively soft material of the driving portion is higher than 3.

4. The modular turbo compressor shaft according to claim 1, wherein the tubular bearing portion includes:
    a tubular cylindrical part having an outer surface configured to cooperate with a radial bearing arrangement of a turbo compressor, and
    a flat disc shaped part having an outer diameter larger than the outer diameter of the tubular cylindrical part, the flat disc shaped part having a first axial end face and a second axial end face opposite to the first axial end face, the first and second axial end faces being configured to cooperate with an axial bearing arrangement.

5. The modular turbo compressor shaft according to claim 4, wherein the flat disc shaped part includes a central opening having a diameter substantially corresponding to the inner diameter of the tubular cylindrical part.

6. The modular turbo compressor shaft according to claim 4, wherein the tubular cylindrical part and the flat disc shaped part are formed as an integral part or as two separate parts.

7. The modular turbo compressor shaft according to claim 1, wherein the hard material of the tubular bearing portion has a Vickers hardness of more than 1500 HV.

8. The modular turbo compressor shaft according to claim 1, wherein:
    the relatively soft material of the impeller portion has a Vickers hardness of less than 500 HV, and/or
    the relatively soft material of the driving portion has a Vickers hardness of less than 500 HV.

9. The modular turbo compressor shaft according to claim 1, wherein the driving portion comprises:
    a mounting part arranged inside the tubular bearing portion, and
    a rotor attachment part for the attachment of a rotor of the turbo compressor.

10. The modular turbo compressor shaft according to claim 9, wherein the rotor attachment part includes an axial bore configured to receive the rotor.

11. The modular turbo compressor shaft according to claim 9, wherein the mounting part of the driving portion includes an axial hole extending along at least a portion of the length of the mounting part of the driving portion.

12. The modular turbo compressor shaft according to claim 1, wherein the impeller portion comprises:
    a mounting part at least partially arranged inside the tubular bearing portion, and
    an impeller attachment part for the attachment of at least one impeller.

13. The modular turbo compressor shaft according to claim 12, wherein the mounting part of the impeller portion includes an axial hole extending along at least a portion of the length of the mounting part of the impeller portion.

14. A centrifugal turbo compressor including a modular turbo compressor shaft according to claim 1.

15. The centrifugal turbo compressor according to claim 14, further including:
    at least one compression stage configured to compress a refrigerant, the at least one compression stage including at least one impeller connected to the impeller portion of the turbo compressor shaft,
    an electric motor configured for driving in rotation the turbo compressor shaft about a rotation axis, the electric motor including a stator and a rotor, the rotor being connected to the driving portion of the turbo compressor shaft.

16. The centrifugal turbo compressor according to claim 14, further including:
a radial bearing arrangement configured for rotatably supporting the tubular bearing portion, and
a thrust bearing arrangement configured to limit an axial movement of the turbo compressor shaft during operation.

17. The modular turbo compressor shaft according to claim 2, wherein:
the ratio between the Vickers hardness of the hard material of the tubular bearing portion and the Vickers hardness of the relatively soft material of the impeller portion is higher than 3, and/or
the ratio between the Vickers hardness of the hard material of the tubular bearing portion and the Vickers hardness of the relatively soft material of the driving portion is higher than 3.

18. The modular turbo compressor shaft according to claim 2, wherein the tubular bearing portion includes:
a tubular cylindrical part having an outer surface configured to cooperate with a radial bearing arrangement of a turbo compressor, and
a flat disc shaped part having an outer diameter larger than the outer diameter of the tubular cylindrical part, the flat disc shaped part having a first axial end face and a second axial end face opposite to the first axial end face, the first and second axial end faces being configured to cooperate with an axial bearing arrangement.

19. The modular turbo compressor shaft according to claim 3, wherein the tubular bearing portion includes:
a tubular cylindrical part having an outer surface configured to cooperate with a radial bearing arrangement of a turbo compressor, and
a flat disc shaped part having an outer diameter larger than the outer diameter of the tubular cylindrical part, the flat disc shaped part having a first axial end face and a second axial end face opposite to the first axial end face, the first and second axial end faces being configured to cooperate with an axial bearing arrangement.

20. The modular turbo compressor shaft according to claim 5, wherein the tubular cylindrical part and the flat disc shaped part are formed as an integral part or as two separate parts.

* * * * *